United States Patent Office 3,780,116
Patented Dec. 18, 1973

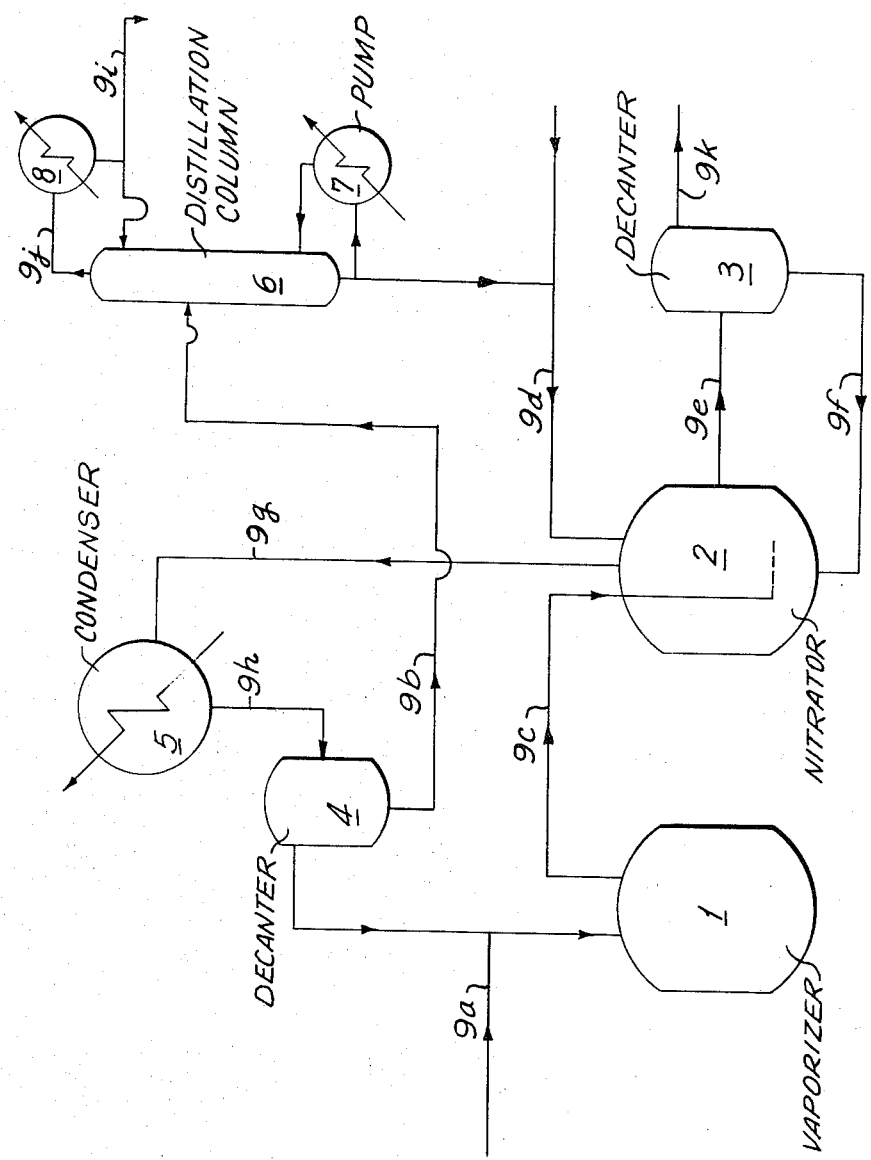

3,780,116
METHOD FOR NITRATION OF AROMATIC HYDROCARBON COMPOUNDS
Prakash Nath Sahgal, Baroda, India, assignor to Zaverchand & Company, Baroda, Gujarat, India
Filed June 15, 1972, Ser. No. 262,935
Int. Cl. C07c 79/10
U.S. Cl. 260—645          6 Claims

ABSTRACT OF THE DISCLOSURE

A process and apparatus for nitration of an aromatic hydrocarbon such as benzene or toluene in which the hydrocarbon is vaporized and bubbled through aqueous nitric acid in a reaction vessel at a temperature which may vary from 50 to 100° C. A mixture of nitric acid and nitrated hydrocarbon which is formed is continuously withdrawn from the reaction vessel and fed to a separator where the nitrated hydrocarbon is separated and withdrawn and the nitric acid is returned to the reaction vessel.

BACKGROUND (a) Field of the invention

This invention relates to improvements in or relating to a continuous process for nitration of aromatic hydrocarbons such as benzene or toluene by aqueous nitric acid and also to apparatus for effecting the method.

(b) Prior art

In nitration processes such as for instance in the nitration of toluene or benzene, the nitration reaction results in the production of two final products, namely, the nitrated material such as nitrotoluene or nitrobenzene and water. As the reaction proceeds further, the water so formed accummulates and prevents the reaction from proceeding any further. In other words, the nitration process is arrested. Hence, this process is not continuous.

It is known that the nitrating agent for nitrating aromatic compounds such as toluene or benzene is the nitronium ion. This is present in strong nitric acid or in mixtures of nitric acid and powerful dehydrating agents such as sulfuric acid. Thus, conventionally, the process of nitration is carried out by using "mixed acids," usually containing 25–35% nitric acid, the rest being sulfuric acid with a small percentage of water. The function of the sulfuric acid is to maintain a high concentration of nitrating agent by binding the water formed during the reaction, thus, permitting the nitration to proceed to completion.

Processes have been suggested in which the presence of sulfuric acid has been avoided, wherein the water present and the water formed during the reaction is removed by "azeotropic distillation." In this particular type of distillation, an azeotrope either of the unconverted hydrocarbon and water (Othmer, D. F., et. al., Ind. Eng. Chem. 34 286–91 (1942) or that of the nitrated hydrocarbon and water (Othmer, D. F., et al., Ind. Eng. Chem. 36 447 (1944) is withdrawn from the top of a rectifying column as a part of the process. Also pertinent is U.S. Pat. No. 2,739,174.

The hereinabove known processes have inherent deficiencies which are overcome by the improved process and device of the invention as will become evident hereinafter.

SUMMARY OF THE INVENTION

According to the invention, the nitration of an aromatic hydrocarbon such as benzene or toluene by aqueous nitric acid (40% by weight) is characterized in that the hydrocarbon vapor generated in a vaporizer is bubbled through the aqueous nitric acid contained in a reaction vessel (nitrator) maintained at a temperature between 50° C. and 100° C. (by additional heating or cooling as the case may be). A nitro compound is produced during the reaction and forms a separate liquid phase, the mixture of nitro compound and nitric acid being continuously fed to a decanter where the mixture is separated.

Subsequently, the nitro compound layer is withdrawn and purified and the nitric acid layer is returned to the reaction vessel.

During the reaction of nitric acid with the hydrocarbon, the unreacted hydrocarbon carrying with it some nitric acid and water leaves the reaction vessel in vapor form and this is condensed and separated in two layers in a second decanter, the hydrocarbon being returned to the vaporizer together with fresh hydrocarbon while the weak nitric acid is fed to a distillation unit wherefrom the upper portion consisting of water is removed as waste, while the bottom of the lower portion consisting of nitric acid is returned to the reaction vessel together with fresh nitric acid.

The apparatus for the nitration of benzene or toluene is characterized in that benzene or toluene vapor generated in a vaporizer are bubbled through aqueous nitric acid (40% by weight) contained in a reaction vessel (nitrator) maintained at a temperature between 50° C. and 100° C. (by additional heating or cooling as the case may be). The resulting nitrobenzene or nitrotoluene forms a separate liquid phase in the reaction vessel, the mixture of nitrobenzene or nitrotoluene and aqueous nitric acid (40% by weight) being continuously recycled through a decanter where separation of the mixture into two distinct layers is effected. The nitrobenzene layer is separated for further purification while the nitric acid layer is returned to the nitrator.

This apparatus is further characterized in that during the reaction of nitric acid and benzene or toluene, the unreacted benzene or toluene carrying with it some amount of nitric acid and water leaves the reaction vessel (nitrator) as a vapor, which is condensed and separated into two layers in a second decanter, the benzene or toluene layer being returned to said vaporizer together with fresh benzene, while the weak nitric acid is fed to a distillation column wherefrom water forming the upper portions of the product is removed as waste, whereas the lower portion of the product consisting of nitric acid is returned to the reaction vessel together with the fresh nitric acid.

As distinguished from the conventional processes, the novel features of the present invention are (1) no mixed acids are used, employing only pure nitric acid, preferably but not essentially with a catalyst, (2) the reactants are introduced into the reactor in such a manner as to obviate the necessity of additional agitation, (3) the process is essentially continuous with the nitrating agent and the aromatic compound being fed into the reactor and the product being continuously recovered.

The following advantages are obtained by the instant process and device:

(i) The benzene vapor bubbling through the aqueous nitric acid maintained in the nitrator provides excellent agitation of the reaction mixture, an important factor known to enhance the rate of nitration.

(ii) The nitrator is kept filled with a maximum volume of the nitric acid phase (in which the nitration reaction substantially takes place), hence improving its utilization.

(iii) During the reaction, there is a maximum of combustible organic matter present in the nitrator, thereby reducing ignition hazard of the process.

(iv) It is possible to maintain the temperature of the reaction mixture independently of the rate of benzene or toluene vapor feed, thus leading to an optimum temperature of operation of the nitrator, this temperature being about 100° C.

(v) Suitable catalysts such as sulfuric acid, phosphoric acid, perchloric acid, or their metal salts, may be introduced into the yield of the process.

(vi) The feed to the distillation unit contains only weak nitric acid with a trace of aromatic compound. Thus the distillation unit and hence the size thereof will be minimized.

BRIEF DESCRIPTION OF THE DRAWING

The invention will now be described with reference to the sole figure of the accompanying drawing which diagrammatically illustrates an apparatus for the nitration of aromatic hydrocarbons, such as benzene or toluene by aqueous nitric acid.

DETAILED DESCRIPTION

In the description hereafter given, the invention will be described with reference to benzene as the aromatic hydrocarbon which is being nitrated, and it is to be understood that toluene and other suitable aromatic hydrocarbons are operable within the scope of the invention.

Benzene is fed from a supply container (not shown) via a pipe 9a to a vaporizer 1. Benzene vapor is generated in the vaporizer 1 and the vapor is passed through pipe 9c and through aqueous nitric acid (40% by weight) contained in a reaction vessel or nitrator 2. The bubbling of the vapor through the acid is effected without the employment of a conventional agitator. The nitrator 2 is maintained at a temperature between 50° C. to 100° C. by additional heating or cooling as necessary. The nitrobenzene in the nitrator 2 is formed as a separate liquid phase. The mixture of nitrobenzene and nitric acid is in an aqueous form and is continuously recycled through a decanter 3 by pipes 9e. In the decanter 3, the mixture is separated into two distinct layers, the crude nitrobenzene being discharged at the top through the pipe 9k for purification, while the nitric acid layer is returned to the nitrator 2 by a pipe 9f.

During the reaction of nitric acid with benzene in the nitrator 2, the unreacted benzene carries with it some amount of nitric acid and water and leaves the nitrator 2 as a vapor in pipe 9g. The vapor is condensed in a condenser 5 wherefrom the condensate flows to a second decanter 4 via a pipe 9h. In decanter 4 two distinct layers are formed, viz a benzene layer and a weak nitric acid layer, the benzene being returned to vaporizer 1 together with fresh benzene while the weak nitric acid is fed by a pipe 9b to a distillation column 6. In column 6 water in an upper portion is discharged as waste while at the lower portion nitric acids recovered and is returned to the reaction vessel 2 together with the fresh nitric acid. Water from the distillation unit is discharged by pipe 9i and 9j under the action of a pump means 8 while the nitric acid is sent back to the nitrator by a recirculating pump means 7.

What is claimed is:

1. A process of nitration of an aromatic hydrocarbon comprising bubbling an aromatic hydrocarbon in vapor form through a solution consisting of aqueous nitric acid contained in a reaction vessel maintained at a temperature between 50° to 100° C. to form a nitrated aromatic hydrocarbon as a separate liquid phase, continuously discharging a mixture of the nitrated aromatic hydrocarbon and nitric acid to a decanter, separating said mixture in the decanter into two respective layers, discharging the aromatic hydrocarbon, and returning the nitric acid to the reaction vessel.

2. A process as claimed in claim 1 comprising recovering unreacted aromatic hydrocarbon carrying with it nitric acid and water from the reaction vessel as a vapor, condensing the vapor and separating the condensate into two respective layers in a second decanter, vaporizing aromatic hydrocarbon obtained in a first layer for supply to said reaction vessel, passing weak nitric acid recovered as the second layer in the second decanter to a distillation unit, separating water as a waste product in the distillation unit from nitric acid, and returning the nitric acid to the reaction vessel.

3. A process as claimed in claim 1 wherein the aromatic hydrocarbon is benzene or toluene.

4. A process as claimed in claim 1 wherein the aqueous nitric acid in the reaction vessel has a concentration of 40% by weight.

5. A process as claimed in claim 1 comprising vaporizing the aromatic hydrocarbon in a vaporizer before bubbling the same through the aqueous nitric acid in the reaction vessel.

6. A process as claimed in claim 5 wherein the aromatic hydrocarbon recovered from the second decanter is fed with fresh aromatic hydrocarbon to said vaporizer for being vaporized before being supplied to the reaction vessel.

References Cited

UNITED STATES PATENTS 2,654,788  10/1953  Marshall, Jr. _____ 260—645 X
2,805,240   9/1957  Prahl _____ 260—990 X

OTHER REFERENCES

Othmer et al., Ind. Eng. Chem. vol. 34, pp. 286–291 (1942).

Othmer et al., Ind. Eng. Chem., vol. 36, pp. 447–451 (1944).

LELAND A. SEBASTIAN, Primary Examiner

U.S. Cl. X.R.

23—260; 260—688